(12) United States Patent
Rao et al.

(10) Patent No.: US 8,430,424 B1
(45) Date of Patent: Apr. 30, 2013

(54) FAR SIDE IMPACT PROTECTION FOR DRIVER

(75) Inventors: Manoharprasad K. Rao, Novi, MI (US); Stephen W. Rouhana, Plymouth, MI (US); Brian R. Spahn, Ann Arbor, MI (US); Robert W. McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 13/326,567

(22) Filed: Dec. 15, 2011

(51) Int. Cl.
*B60R 21/16* (2006.01)
(52) U.S. Cl.
USPC ............. 280/730.2; 280/735; 280/743.2
(58) Field of Classification Search ........... 280/730.2, 280/735, 739, 742, 743.2
See application file for complete search history.

(56) References Cited

U.S. PATENT DOCUMENTS

| | | | |
|---|---|---|---|
| 5,172,790 A * | 12/1992 | Ishikawa et al. | 180/268 |
| 6,454,300 B1 | 9/2002 | Dunkle et al. | |
| 7,347,444 B2 | 3/2008 | Wheelwright | |
| 7,419,184 B2 | 9/2008 | Green et al. | |
| 7,658,407 B2 | 2/2010 | Ford et al. | |
| 7,748,740 B2 | 7/2010 | Thomas | |
| 7,976,058 B2 * | 7/2011 | Suzuki et al. | 280/729 |
| 2005/0209756 A1 * | 9/2005 | Ueno | 701/45 |
| 2006/0097492 A1 | 5/2006 | Bakhsh et al. | |
| 2007/0005207 A1 * | 1/2007 | Foo et al. | 701/45 |
| 2009/0292423 A1 * | 11/2009 | Norton | 701/45 |
| 2011/0022275 A1 * | 1/2011 | Oosaki | 701/45 |

FOREIGN PATENT DOCUMENTS
WO WO03080403 A1 10/2003

OTHER PUBLICATIONS

Paper No. 98-S8-W-23, Stilinski, et al., Vehicle Far-Side Impact Crashes, P{roceedings of 16th International Technical Conference on the Enhanced Safety of Vehicles (ESV), Windsor, Ontario, Canada, May 1998, pp. 1819-1926.
Paper No. 05-0299-0, Fildes, et al, Occupant Protection in Far Side Crashes, Proceedings of the 19th International Technical Conference on the Enhanced Safety of Vehicles, Washington, DC, Jun. 2005, pp. 1-6.
Paper No. 05-0420-0, Gabler, et al., Far Side Impact Injury Risk for Belted Occupants in Australia and the United States, Proceedings of the 19th International Technical Conference on the Enhanced Safety of Vehicles, Washington, DC, Jun. 2005, pp. 1-11.

* cited by examiner

*Primary Examiner* — Joseph Rocca
*Assistant Examiner* — Robert A Coker
(74) *Attorney, Agent, or Firm* — Frank MacKenzie; MacMillan, Sobanksi, & Todd, LLC

(57) ABSTRACT

A transportation vehicle has an inflatable restraint mounted proximate to a passenger seating location which is configured to inflate in an appropriate manner to interact with a passenger during an impact. The inflatable restraint is of a type not inflated in response to a frontal impact when the passenger seating location is empty. For enhanced protection of a driver, a restraint controller detects a far side impact that initiates at the side of the vehicle opposite from the driver, detects that the passenger seating location is empty, and causes inflation of the inflatable restraint to interact with the driver in response to the far side impact and the passenger seating location being empty.

19 Claims, 4 Drawing Sheets

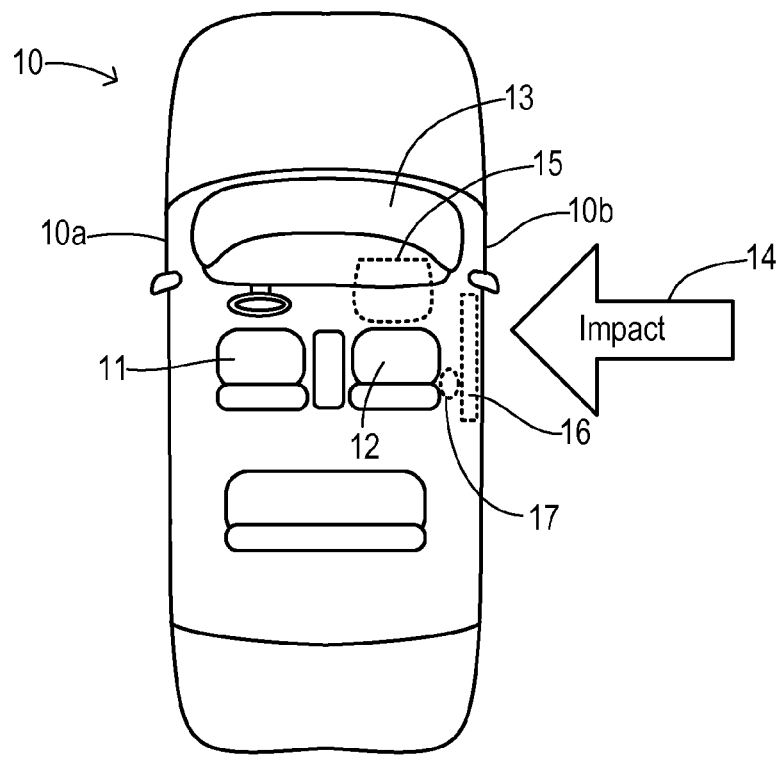
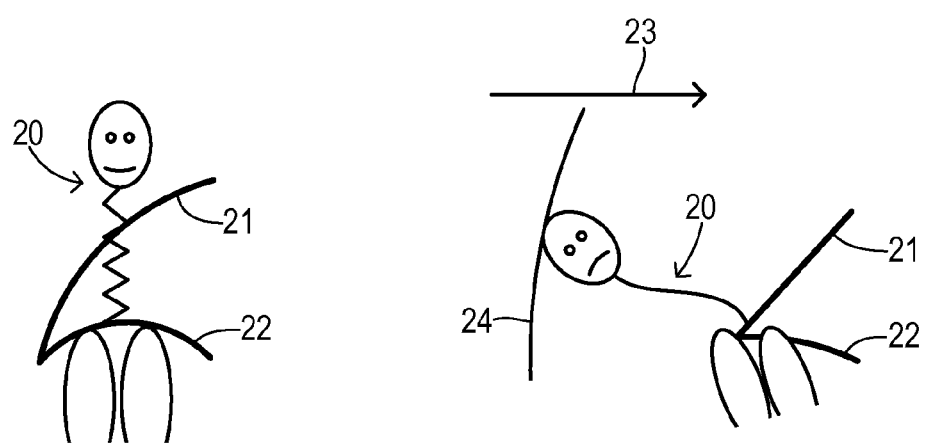
Fig. 1
Fig. 2   Fig. 3

FAR SIDE IMPACT PROTECTION FOR DRIVER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to inflatable occupant restraint systems for transportation vehicles, and, more specifically, to airbag deployment during a side impact.

Supplemental restraint systems in passenger cars and trucks include frontal airbags, side curtain airbags, thorax airbags, pelvis airbags, and inflatable knee bolsters, for example. Deployment strategies for inflating the restraints attempt to optimize airbag deployment in a way that gives maximum protection to occupants in response to a type of impact, its direction and severity, and an approximate location and size of the occupants. In some instances of a frontal crash, a combination of airbags may be deployed such as a frontal airbag and a knee bolster. In some instances of a side impact with sufficient severity, pelvis and thorax bags and a side curtain airbag may be deployed without deploying the frontal airbag. Many other combinations are also used.

Adaptive airbag systems typically adjust the inflation force and/or the inflated shape of an airbag to tailor its deployment to a particular occupant or crash situation. Information concerning the severity of a crash and the occupant's location, weight, and/or relative size may be used by a control unit or algorithm to selectably deploy portions of multi-stage airbags or to control active vents according to a desired deployment pressure or force, for example.

The packaging space for installing airbag devices within a vehicle interior is limited. Thus, it would be desirable to employ a restraint system architecture and an associated deployment strategy that provides optimal protection and utilizes existing safety-related components in an efficient manner. A typical vehicle includes several inflatable restraints designed to protect each of the driver and a front seat occupant. When a front occupant seat is empty, passenger airbags are typically not deployed in order to minimize the need for subsequent replacement of the passenger airbag device.

In recent years, the relative frequency of side impacts with respect to frontal impacts has been increasing. Typically, pelvis and thorax bags and a side curtain airbag may deploy on the struck side of a vehicle during a side impact in order to protect a passenger on that side of the vehicle. When the struck side corresponds to the passenger side of the vehicle and the corresponding passenger seat is empty, then pelvis and thorax bags and the side curtain airbag on the struck passenger side are not deployed.

A far side impact is an event wherein a vehicle is struck on a side remote from the vehicle occupant under consideration. In other words, with regard to the driver, a far side impact occurs on the passenger side of the vehicle. In such an impact, the driver may be accelerated toward the passenger side of the vehicle. This would be true even for a driver wearing a seat belt because the shoulder belt is not designed for side impacts, so the upper torso of the driver can move out of the shoulder belt in response to the lateral acceleration of a far side impact. The movement can potentially cause a lateral shear and other distortions of the driver's body and/or an impact with structures on the passenger side of the vehicle (especially in smaller cars).

In order to provide enhanced far side impact protection, additional inflatable restraints have been used which deploy from a central console, roof, windshield header, or the inboard side of the front seats. It would be desirable to provide enhanced far side impact protection for a driver without incurring the increased complexity and potential out-of-position risks associated with such additional airbags.

SUMMARY OF THE INVENTION

The present invention provides a strategy for providing driver protection during a far side impact using the deployment of passenger side curtain airbags and passenger frontal, passenger knee airbag, side pelvic, thorax, and/or head airbags or bolsters. The inflation of the airbags is controlled so that they are in a proper deployed position before the driver contacts the bags. The passenger airbags may be controlled to achieve a desired timing for reaching a desired configuration (such as by controlled actuation of dual stage inflators). An active vent can be controlled to achieve a desired duration for the passenger airbags to remain inflated, which would typically be longer than for an average frontal impact. Based on a specific vehicle interior or size of the driver, the deployment shape of the passenger airbag can be controlled with a tether release strategy. As a result of the foregoing, the invention reduces direct contact between the driver and any hard vehicle interior components on the struck side of the vehicle. For any particular model of vehicle, restraint system deployment including any venting control timing or target shape for a deployed airbag can be designed based on various impact simulations (such as with the MADYMO software package available from TASS Americas of Livonia, Mich.). The resulting deployment strategy enhances driver far side impact protection without any additional inflatable restraints.

In one aspect of the invention, an apparatus for a transportation vehicle comprises driver seating location for receiving a driver on a first side of the vehicle. A passenger seating location is provided for receiving a passenger on a second side of the vehicle in a side-to-side row with the driver seating location. Acceleration and pressure-based crash sensors are responsive to occurrences of a frontal impact and a side impact. An occupant sensor detects whether the passenger seating location is occupied by a passenger or is empty. At least one inflatable restraint is mounted proximate to the passenger seating location and is configured to inflate in a manner to interact with a passenger in the passenger seating location. The inflatable restraint is not inflated in response to a frontal impact when the passenger seating location is empty. A restraint controller is coupled to the crash sensors, the occupant sensor, and the inflatable restraint for 1) detecting a far side impact that initiates at the second side of the vehicle, 2) detecting that the passenger seating location is empty, and 3) causing inflation of the inflatable restraint to interact with the driver in response to the far side impact and the passenger seating location being empty.

BRIEF DESCRIPTION OF THE DRAWINGS

FIG. 1 is a top view of a vehicle illustrating a far side impact.

FIG. 2 represents the position of a driver restrained by a seat belt prior to a far side impact.

FIG. 3 represents the position of the driver of FIG. 2 as could occur during a far side impact.

DETAILED DESCRIPTION OF PREFERRED EMBODIMENTS

Figure 4:
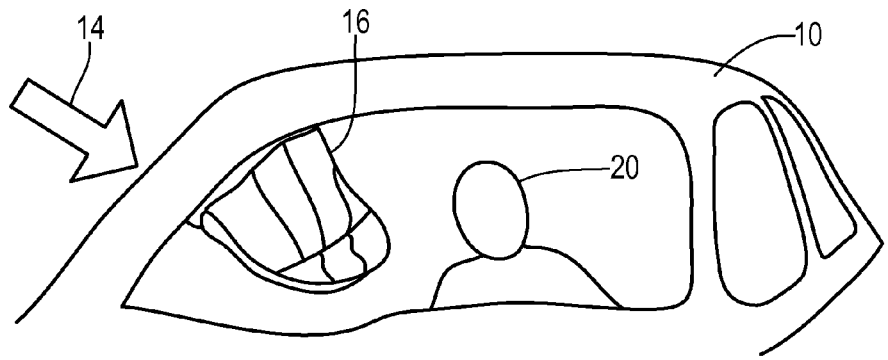
FIG. 4 is a perspective view showing a deployment of a passenger-side curtain airbag during a far side impact according to the present invention.

Referring now to FIG. 1, a vehicle 10 has a driver seating location 11 and a passenger seating location 12 positioned rearward of an instrument panel 13. Driver seating location 11 is on a first side 10a of vehicle 10, and passenger seating location 12 is on a second side 10b of vehicle 10. Driver seating location 11 and passenger seating location 12 are in a side-to-side row arrangement. An impact 14 is shown striking side 10b of vehicle 10. With respect to a driver in seating location 11, impact 14 is a far side impact. FIG. 1 represents a left-hand drive vehicle. In a right-hand drive vehicle, the present invention would correspondingly apply to the situation where a far side impact occurs on the left passenger side (i.e., opposite side from the driver).

Passenger seating location 12 has various inflatable restraints associated with it for providing passenger protection, including one or more of a frontal passenger airbag 15, a passenger side curtain airbag 16, pelvis and/or thorax airbag 17, and other known devices such as a head airbag, a knee airbag, or a knee bolster (not shown). Pelvis and thorax airbags can be separate airbags packaged in the seat or side door or they may be combined into a single composite airbag to provide side impact protection to the pelvis and thorax regions of the passenger seat occupant. In the prior art, when a passenger is present in seating location 12 and a frontal impact occurs, airbag 15 may be deployed. In a side impact 14 on the passenger side with a passenger being present, side curtain airbag 16, pelvis/thorax airbag 17, and other side airbags such as head airbags may be deployed.

FIG. 2 represents a driver 20 wearing a seat belt including a shoulder belt portion 21 and a lap belt portion 22. FIG. 3 shows driver 20 experiencing forces during a far side impact causing a sideways acceleration in the direction of arrow 23. The acceleration can potentially cause driver 20 to slip sideways out from shoulder belt 21 toward a far side interior surface 24 of the vehicle (e.g., a passenger-side door being crushed by the impact). Driver 20 might experience lateral forces and in some cases might impact with interior surface 24.

FIG. 4 shows an improvement of the present invention wherein one or more of the passenger airbags deploys to protect driver 20 during far side impact 14. Although side curtain airbag 16 is shown being deployed in FIG. 4, any combination of passenger airbags and bolsters could be utilized in the present invention. Such passenger airbags may deploy in the same manner as they would in a crash in which a passenger is present (especially when such airbags are not capable of adaptive deployment), except that there may be an appropriate change in the time of initiating deployment if necessary. When it has adaptive capabilities, the passenger airbag may preferably be inflated with a first inflation configuration when the passenger seating location is occupied by a passenger during a frontal collision, and may be inflated with a second inflation configuration different from the first inflation configuration when the passenger seating location is empty during a far side impact.

Figure 5A:
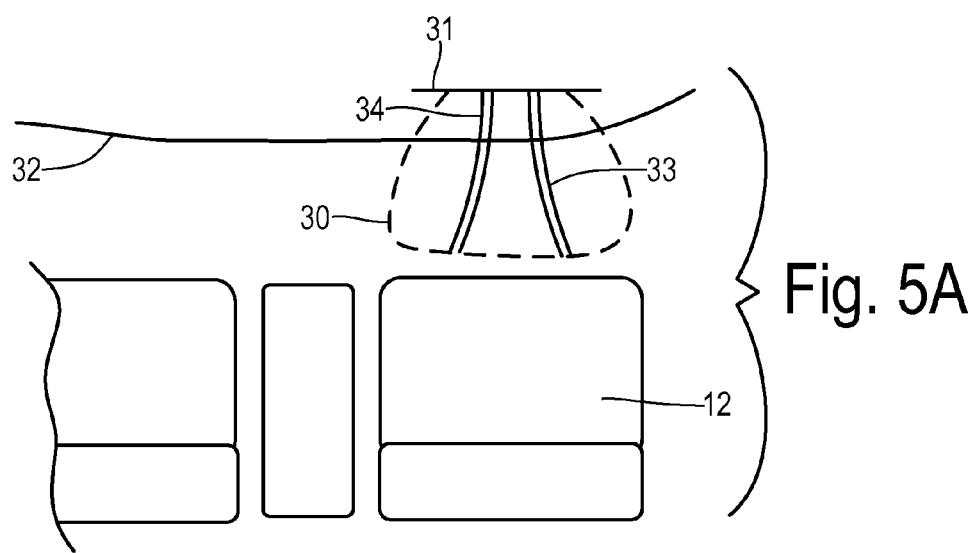
FIGS. 5A and 5B are top views showing first and second inflation configurations of a frontal airbag for passenger protection and driver far-side impact protection, respectively.

The first and second inflation configurations may be comprised of different inflated shapes and/or different inflation timing. FIG. 5 shows an example wherein different inflated shapes are employed. FIG. 5A corresponds to a frontal or other impact that results in deployment of the passenger frontal airbag when passenger seating location 12 is occupied by a passenger. Specifically, the frontal airbag has an inflated shape 30 (shown by dashed lines) after deploying from an airbag door 31 in an instrument panel 32. A pair of tethers 33 and 34 are incorporated in the frontal airbag to limit shape 30 to an optimum position for protecting the passenger in seating location 12 during a frontal impact.

Figure 5B:
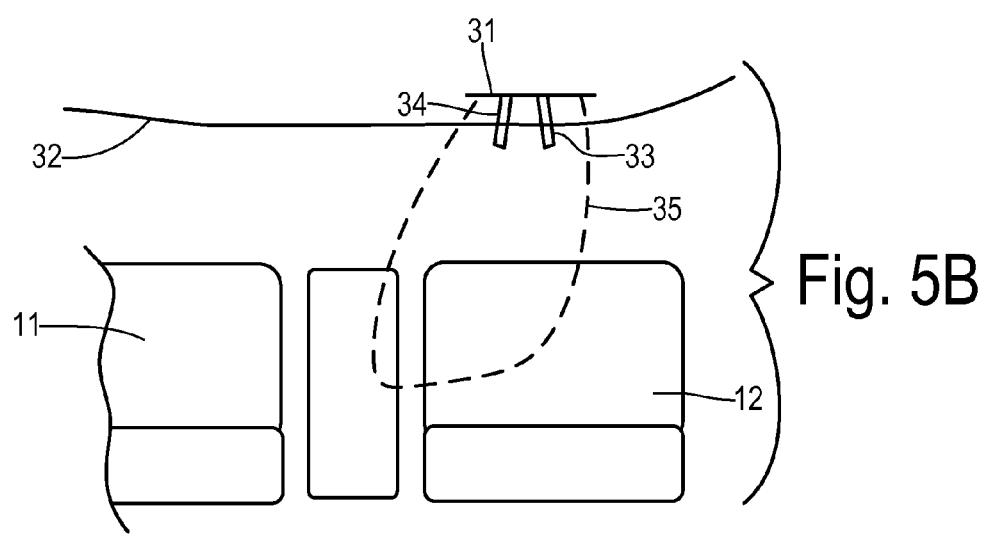

FIG. 5B corresponds to a far side impact when passenger seating location 12 is empty. The same airbag provides a second shape 35 which extends farther over seating location 12 and farther in the direction of seating location 11 in order to obtain a better placement for interacting with the driver, thereby countering the tendency of the driver to move sideways toward seating location 12. In order to obtain second shape 35, tethers 33 and 34 are severed prior to or during inflation. Instead of tethers as shown, the different shape can be obtained using a multi-stage inflator wherein in different inflator stages fill different chambers in the airbag, for example. Tethers and multi-stage inflators are well known in the art and have been employed in adaptive systems for optimizing an inflated airbag shape and stiffness according to differences in size and weight of passengers in a particular seat location.

Figure 6:
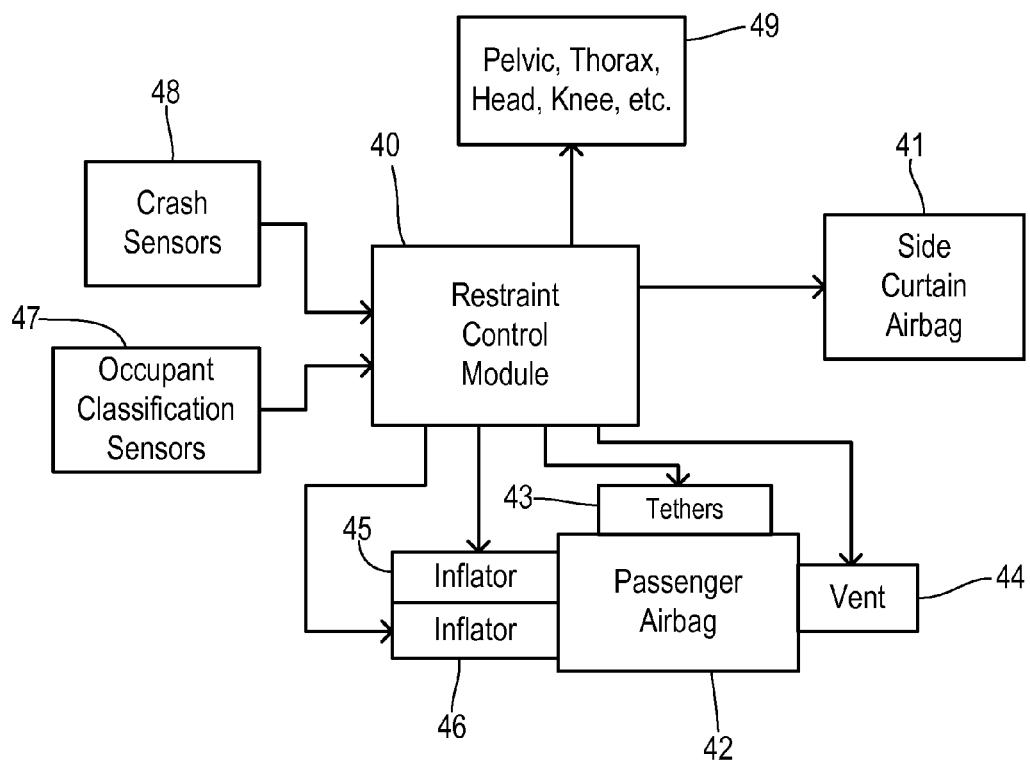
FIG. 6 is a block diagram of one embodiment of apparatus according to the invention.

One embodiment of apparatus for implementing the present invention is shown in FIG. 6. A restraint control module 40 controls the inflation for a number of inflatable restraints such as a side curtain airbag 41, a passenger frontal airbag 42, and other airbags that may be present including pelvis, thorax, head, and knee airbags or active bolsters indicated at 49. In a preferred embodiment wherein an inflation configuration of frontal airbag 42 is adaptively controlled, restraint control module is connected to tethers 43, an active vent 44, and multi-stage inflators 45 and 46. Restraint control module 40 is further coupled to crash sensors 48 and occupant classification sensors 47. Crash sensors 48 may include accelerometers, pressure sensors, and other known devices for detecting frontal, side, and other impact events. The resulting crash signals also characterize the magnitude of the severity of an impact. Occupant classification sensors may include weight sensors, optical sensors, or manually-operated inputs to identify a particular size or weight of the driver or other occupants.

Figure 7:
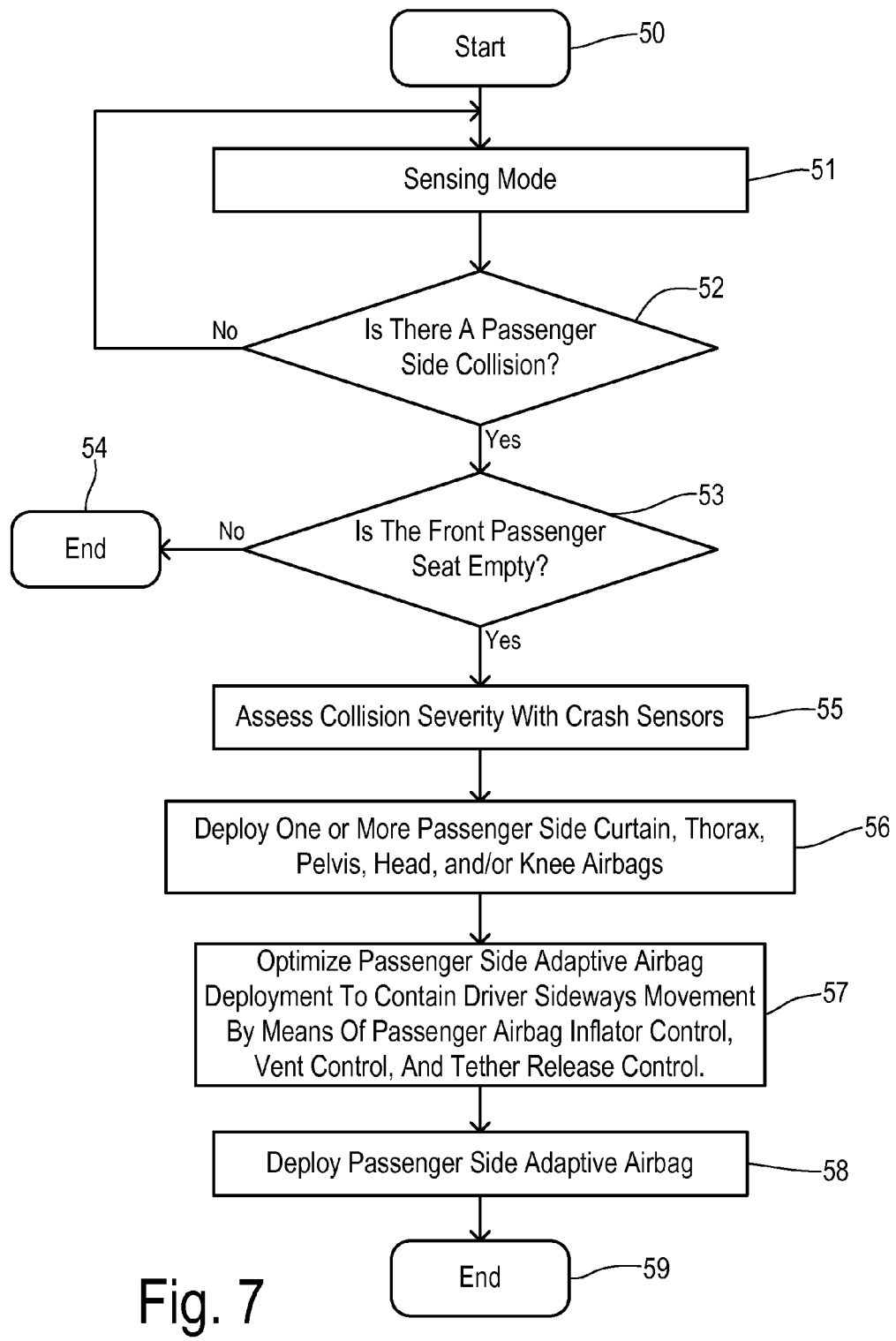
FIG. 7 is a flowchart showing one embodiment of a method according to the invention.

The restraint control module may preferably operate according to a preferred method shown in FIG. 7. After initializing at step 50, the method proceeds to operate in a sensing mode at step 51. In the sensing mode, the crash sensors are monitored and the occupant classification sensors are used to monitor for the presence and size/weight/type of occupants in various seating locations. A check is made in step 52 to determine whether an impact has begun to occur on the passenger side of the vehicle. If not, then sensing continues at step 51. When a passenger-side impact is detected, a check is made in step 53 to determine whether the front passenger seat is empty. If not, then the far side impact strategy ends at step 54 and any deployment of the passenger side airbags can be determined in the conventional manner.

If the front passenger seat is empty, then a severity of the side impact is assessed using the crash sensors in step 55. The detection threshold for activating the airbag deployment to protect the driver using the passenger frontal, side curtain, pelvic, thorax, or other airbags may be the same threshold as used for determining a deployment for when a passenger is present in the passenger seat, or a different threshold may be used. The particular threshold to be used can be determined based on crash simulations for a particular vehicle design and the simulated sideways motion experienced by the driver in various simulated impacts.

When the severity of the far side impact calls for action to be taken, then the passenger side curtain airbag, and other non-adaptive passenger side airbags, such as thorax, pelvis, head, and knee bags can be deployed in step 56. Some of these types of accessory airbags may typically have only one inflation configuration due to their smaller size.

In step 57, an optimized inflation configuration for adaptive airbag devices may be determined for protecting the driver during the far side impact. For example, driver sideways movement may be estimated in response to the occupant classification sensors and the severity of the crash determined using the crash sensors. Based on the amount of time required for the driver sideways movement and the location where optimum cushioning will occur for the driver, the restraint control module determines an optimum inflation configuration. The desired configuration may be obtained by selectably controlling airbag inflation, venting, and/or tethering. The inflation configuration and the specific manner of controlling the inflator, vent, and tether controls may be determined by the restraint control module in response to internally-stored models or could alternatively be obtained using look-up tables that are defined in advance. Based on the determined inflation configuration, the frontal passenger-side airbag is deployed in step 58 and the method ends in step 59. It should be noted that the aforementioned optimization could also be performed for the other airbags, if desired, provided their designs supported adaptivity.

In general, a second inflation configuration used when the frontal passenger airbag is deployed to protect a driver during a far side impact may be characterized by 1) a shape shifted rearward and toward the driver, and/or 2) an inflation timing which has a generally delayed onset and a longer duration. The inflation timing may begin later due to the extra time it would typically take for the movement of the driver to approach the passenger side of the vehicle. The delay in inflation can be controlled by delaying the onset of inflation and by slowing the inflation rate by appropriate control of the multi-stage inflator. The inflation time would typically last longer due to the greater range of movement of the driver and the time required for passenger-side vehicle structures to crush toward the driver. The longer duration of inflation can be controlled using an active vent as known in the art.

When the different inflation configuration is comprised of a different inflated shape, known releasable tether technologies for restricting expansion of an airbag can be employed. For example, straps inside the airbag may have a conventional tether release mechanism such as a pyrotechnic cutter which is selectably activated according to the shape into which the airbag is to be inflated.

It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims. Although described in connection with a driver seating location and a passenger seating location in a side-to-side row, the present invention is also applicable to inflatable restraints in other rows of a vehicle behind the driver and front-row passenger.

What is claimed is:

1. An apparatus in a transportation vehicle comprising:
a driver seating location for receiving a driver on a first side of the vehicle;
a passenger seating location for receiving a passenger on a second side of the vehicle in a side-to-side row with the driver seating location;
crash sensors responsive to occurrences of a frontal impact and a side impact;
an occupant sensor for detecting whether the passenger seating location is occupied by a passenger or is empty;
an inflatable restraint mounted proximate to the passenger seating location and configured to inflate in a manner to interact with a passenger in the passenger seating location, wherein the inflatable restraint is not inflated in response to a frontal impact when the passenger seating location is empty; and
a restraint controller coupled to the crash sensors, the occupant sensor, and the inflatable restraint for 1) detecting a far side impact that initiates at the second side of the vehicle, 2) detecting that the passenger seating location is empty; wherein the inflatable restraint is inflated with a first inflation configuration when the passenger seating location is occupied by a passenger during an impact, and wherein the inflatable restraint is inflated with a second inflation configuration different from the first inflation configuration when the passenger seating location is empty during the far side impact, and 3) causing inflation of the inflatable restraint to interact with the driver in response to the far side impact and the passenger seating location being empty.

2. The apparatus of claim 1 wherein the inflatable restraint is a side curtain, pelvis, thorax, or knee airbag proximate to the second side of the vehicle.

3. The apparatus of claim 1 wherein the vehicle includes an instrument panel proximate the passenger seating location and wherein the inflatable restraint is a frontal airbag that deploys from the instrument panel.

4. The apparatus of claim 1 wherein the first inflation configuration includes a first inflated shape, and wherein the second inflation configuration includes a second inflated shape.

5. The apparatus of claim 4 wherein the inflatable restraint includes a releasable tether for restricting expansion of the inflatable restraint, and wherein the restraint controller selectably releases the releasable tether according to the first or second inflated shape.

6. The apparatus of claim 4 wherein the inflatable restraint includes a plurality of inflator stages, and wherein the restraint controller selectably activates the inflator stages according to the first or second inflated shape.

7. The apparatus of claim 1 wherein the first inflation configuration includes a first timing, and wherein the second inflation configuration includes a second timing.

8. The apparatus of claim 7 wherein the second timing results in the inflatable restraint being inflated for a longer duration than for the first timing.

9. The apparatus of claim 7 wherein the inflatable restraint includes an active vent, and wherein the restraint controller selectably activates the active vent according to the first or second timing.

10. The apparatus of claim 7 wherein the second timing results in inflation of the inflatable restraint beginning later after the detection of an impact than for the first timing.

11. A method of controlling an inflatable restraint in a transportation vehicle, wherein the vehicle has a driver seating location for receiving a driver on a first side of the vehicle and a passenger seating location for receiving a passenger on a second side of the vehicle in a side-to-side row with the driver seating location, wherein the inflatable restraint is configured to inflate in a manner to interact with a passenger in the passenger seating location, wherein the inflatable restraint is not inflated in response to a frontal impact when the passenger seating location is empty, the method comprising the steps of:

sensing impacts including a frontal impact and a side impact;

detecting whether the passenger seating location is occupied by a passenger or is empty; wherein the inflatable restraint is inflated with a first inflation configuration when the passenger seating location is occupied by a passenger during an impact, and wherein the inflatable restraint is inflated with a second inflation configuration different from the first inflation configuration when the passenger seating location is empty during the far side impact;

detecting a far side impact that initiates at the second side of the vehicle;

detecting that the passenger seating location is empty; and inflating the inflatable restraint to interact with the driver in response to the far side impact and the passenger seating location being empty.

12. The method of claim 11 wherein the first inflation configuration includes a first inflated shape, and wherein the second inflation configuration includes a second inflated shape.

13. The method of claim 12 wherein the inflatable restraint includes a releasable tether for restricting expansion of the inflatable restraint, and wherein the method further comprises the step of:

selectably releasing the releasable tether according to the first or second inflated shape.

14. The method of claim 12 wherein the inflatable restraint includes a plurality of inflator stages, and wherein the method further comprises the step of:

selectably activating the inflator stages according to the first or second inflated shape.

15. The method of claim 11 wherein the first inflation configuration includes a first timing, and wherein the second inflation configuration includes a second timing.

16. The method of claim 15 wherein the second timing results in the inflatable restraint being inflated for a longer duration than for the first timing.

17. The method of claim 15 wherein the inflatable restraint includes an active vent, and wherein the method further comprises the step of:

selectably activating the active vent according to the first or second timing.

18. The method of claim 15 wherein the second timing results in inflation of the inflatable restraint beginning later after the detection of an impact than for the first timing.

19. An apparatus in a transportation vehicle comprising:

a first seating location for receiving a first passenger on a first side of the vehicle;

a second seating location for receiving a second passenger on a second side of the vehicle in a side-to-side row with the first seating location;

crash sensors responsive to occurrences of a frontal impact and a side impact;

an occupant sensor for detecting whether the first and second seating locations are occupied by a passenger or are empty;

an inflatable restraint mounted proximate to the second seating location and configured to inflate in a manner to interact with a passenger in the second seating location, wherein the inflatable restraint is not inflated in response to a frontal impact when the second seating location is empty; and a restraint controller coupled to the crash sensors, the occupant sensor, and the inflatable restraint for 1) detecting a far side impact that initiates at the second side of the vehicle, 2) detecting that the first seating location is occupied and that second seating location is empty, and 3) causing inflation of the inflatable restraint proximate the second seating location to interact with the passenger in the first seating location in response to the far side impact; wherein the inflatable restraint is inflated with a first inflation configuration when the second seating location is occupied during an impact, and wherein the inflatable restraint is inflated with a second inflation configuration different from the first inflation configuration when the second seating location is empty during the far side impact.

* * * * *